Aug. 22, 1967  D. A. SCOLES  3,337,775
VIBRATION ISOLATION MEANS
Filed March 26, 1965  3 Sheets-Sheet 3

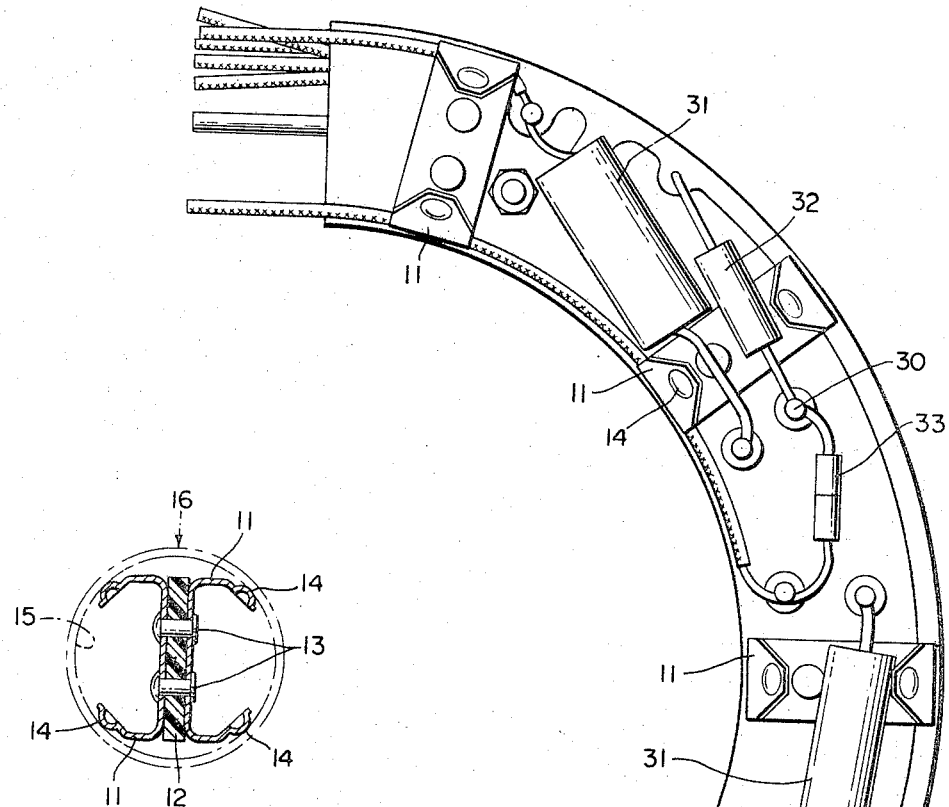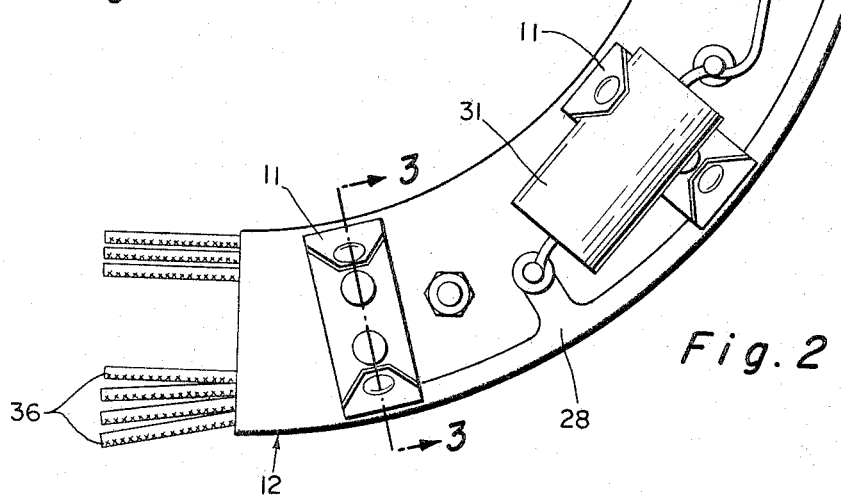

INVENTOR.
DAVID A. SCOLES
BY C. E. Vautrain Jr. AGENT
ATTORNEY

United States Patent Office 3,337,775
Patented Aug. 22, 1967

3,337,775
VIBRATION ISOLATION MEANS
David A. Scoles, Riverside, Calif., assignor to the United States of America as represented by the Secretary of the Navy
Filed Mar. 26, 1965, Ser. No. 443,111
5 Claims. (Cl. 317—120)

The invention described herein may be manufactured and used by or for the Government of the United States of America for governmental purposes without the payment of any royalties thereon or therefor.

This invention relates to mounting means for missile components and more particularly to mounting means which serve to cushion and protect electronic missile components from vibration and shock forces generated during missile flight.

Heretofore missile components have been mounted within the missile in a somewhat haphazard fashion, major consideration being given to component accessibility for repair or replacement and missile balance. In such prior constructions the various components have generally been separate rugged units of substantial size and weight which materially affected missile balance and were supported in place by clamps, straps and various cumbersome fasteners. In some cases a pad of cushion material might be added to provide some component support, however, this was not done to control vibration of the component.

Recent developments in component miniaturization now make it possible for assemblies comprising large numbers of components to be grouped together in a small space upon a suitable supporting panel. The panel can then be positioned where needed in the missile assembly. This has space saving advantages, however, such components being light and fragile are relatively easily damaged and are particularly subject to damage by missile vibration and acceleration and deceleration forces. It has been found that because of the peculiar structural relationships and vibration characteristics of airborne missiles difficulty was encountered in keeping such panels from responding to missile vibrations and setting up harmonic vibrations which could be increasingly augmented until component failure occurred.

It is therefore an object of the present invention to provide a system for supporting missile components such that a maximum amount of isolation of the components from the missile vibration is obtained.

A further object of the present invention is to provide simple, effective and inexpensive means for conveniently supporting missile components and groups of associated missile components in a missile structure in such a way that they will be most effectively isolated from missile shock and vibration.

An additional object of the present invention is to provide effective means for protecting lightweight, fragile electronic parts from missile vibration effects.

Another object is to provide the components so mounted with protection from moisture and gaseous or other contaminants that might affect their operation.

Other objects and many of the attendant advantages of this invention will be readily appreciated as the same becomes better understood by reference to the following detailed description when considered in conjunction with the accompanying drawings in which like numerals designate like parts throughout and wherein:

FIG. 2 is a similar view showing the under surface of the panel illustrated in FIG. 1;

FIG. 3 is a transverse cross-sectional view taken along a line substantially corresponding to line 3—3 of FIG. 2;

Figure 1:
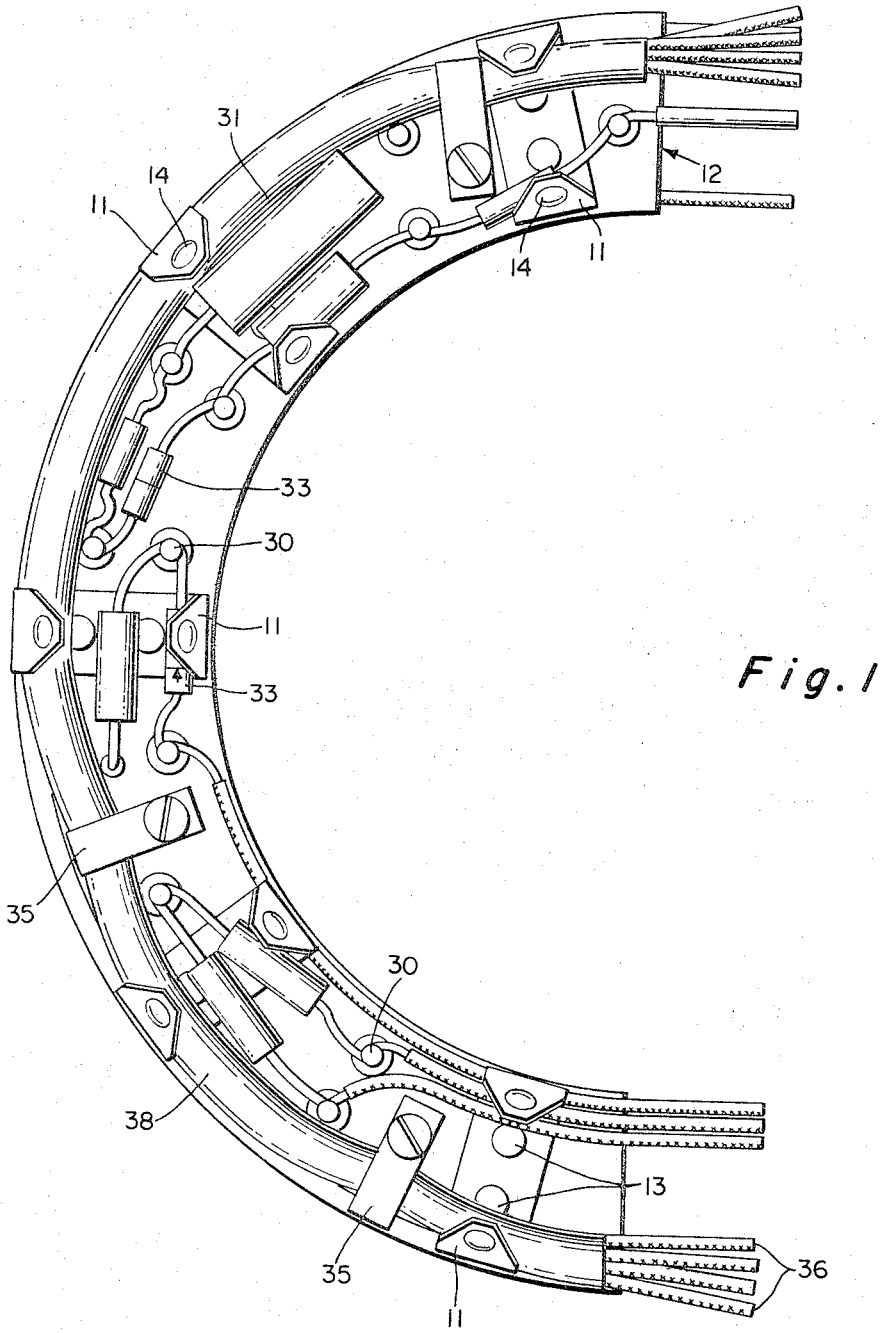
FIG. 1 is a plan view of a missile component mounting panel showing electronic components thereon.

Referring now to the drawings in detail, the embodiment illustrated comprises a mounting panel which may be curved in shape and formed as illustrated in FIGS. 1–3. It may be formed of any suitable dielectric material such as plastic bonded glass reinforced laminate. If desired, the mounting panel may be provided with printed circuitry including a plurality of terminal posts extending through the panel and serving to electrically interconnect electronic components mounted on opposite sides of the panel as illustrated. As is well known in the art these components may comprise capacitors, resistors, diodes, etc. making up a particular assembly or sub-assembly of missile circuitry. Where cable members interconnect these components, suitable cable encircling clamps may be provided to snugly retain the cables in place.

In the embodiment illustrated, pairs of resilient C-clips 11 are located on opposite sides of the mounting panel 12 in back-to-back relationship and are secured thereto by any suitable fastening means such as a pair of rivets 13. These clips 11 are preferably shaped as illustrated in the cross-sectional view FIG. 3, and have dimples or embossed contact points 14 adapted to engage the inside wall 15 of a tube or sleeve 16 into which the panel may be inserted as discussed hereinafter. From this construction it will be apparent that the component supporting panel 18 may readily be inserted into the open end 20 of a tubular housing 16 illustrated in FIGS. 4 and 5 and the parts are so arranged and proportioned that the panel and all of its components are uniformly spaced from the inner walls which are contacted only by the contact points 14 at the end of each C-clip 11. In this manner the whole panel assembly is positively and accurately yet resiliently supported in place and, in the embodiment illustrated, since there are ten clips, there will be twenty contact points spaced around the assembly and along its curving length which points will engage the interior wall surface 15 of the tubular housing 16 and support the panel walls and components therefrom.

After insertion of the electronic supporting panel 12 within the housing 16, the housing ends may be sealed hermetically or otherwise to protect the contents leaving only suitable openings for electrical connections to be made through the sealed area.

Figure 4:
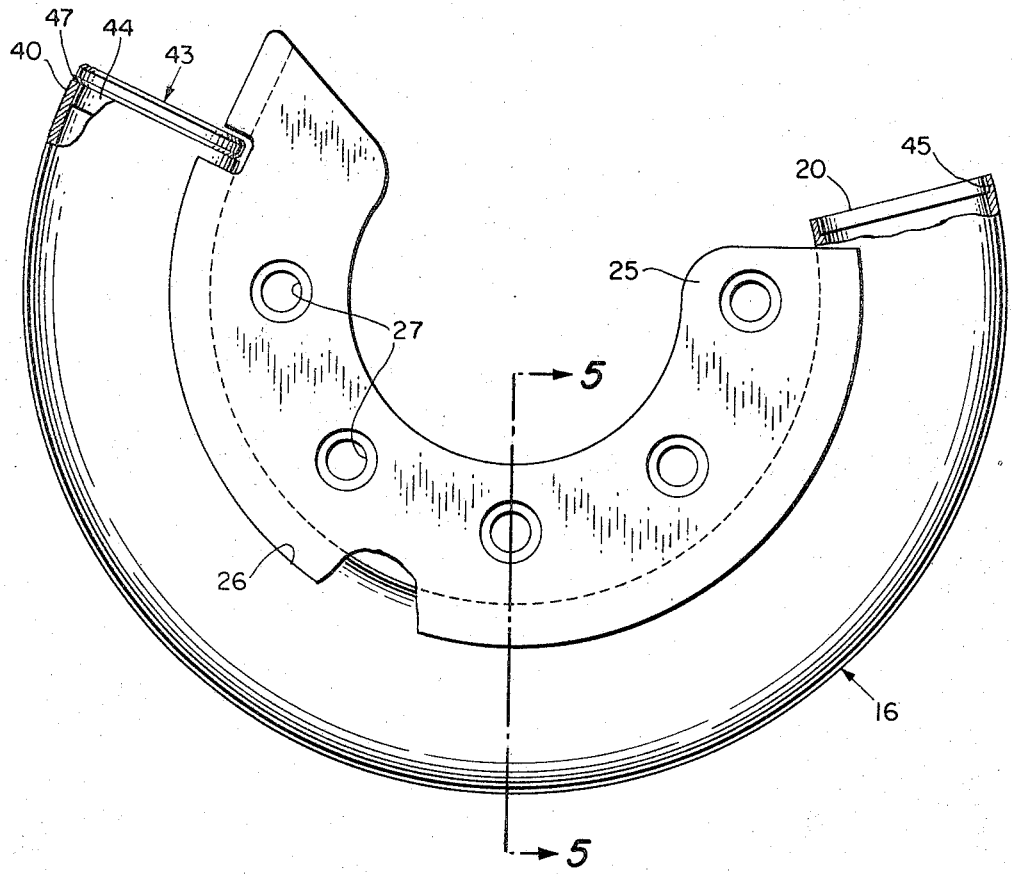
FIG. 4 is a plan view on a slightly reduced scale and partially in section of an enclosure adapted to house the mounting panel and attached components.
Figure 5:
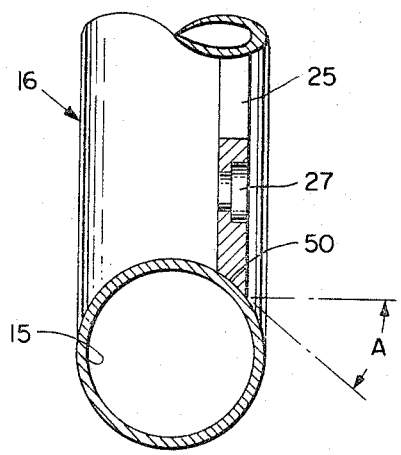
FIG. 5 is a transverse sectional view taken along a line substantially corresponding to line 5—5 of FIG. 4.

A centrally located mounting plate 25 having an outer edge 26 suitably affixed to the exterior of the tube 16 may be located as shown in FIG. 4 and FIG. 5. Openings 27, through plate 25 are provided for mounting bolts, not shown, which secure the entire assembly in place in any desired matter as by engagement of a mounting bracket, not shown.

As shown in FIGS. 1, 2 and 3, a printed circuit 28 may be formed integral with mounting panel 12 and the panel may have terminal posts 30 affixed thereto to which a variety of components such as capacitors 31, resistors 32, diodes 33, etc. may be connected to comprise, for example, an assembly for a missile firing circuit. Additionally affixed to the mounting panel 12 may be a plurality of cable clamps 35 for maintaining in position groups of electrical connectors 36 which may be enclosed in electrical insulation 38.

To provide a packaging system which would have the desired qualities of vibration isolation and hermetical sealing and avoid the deficiencies and disadvantages of existing methods and devices for mounting such electronic packages as the present firing switch, which existing devices and methods include embedding the electronic components in a potting compound, the individual components of the invention are in the case of larger components such as the capacitors 31 preferably cemented to the mounting board.

Where the mounting panel 12 is, as in the preferred embodiment, made of glass filled epoxy, the larger components are cemented thereto, not shown, by applying cement longitudinally along the undersurface of these components. As in conventional applications of such cement, both the components and board must be free of contaminants such as oil, paint, varnish, etc. prior to application of the cement. After applying cement, the components are pressed to the board during assembly at such time as the cement becomes actively tacky. To obtain desired results, solid content of cement preferably should be maintained between 20% and 30% during application. Soft solder preferably is used for all connections soldered to printed circuit 28. Smaller components such as the resistors and some of the diodes though not cemented to mounting panel 12 are preferably positioned so as to be in physical contact with either the panel or clips 11.

With the electronic components soldered, cemented and oterwise attached and positioned with respect to mounting panel 12, the assembly thereof is prepared for positioning in a casing which in turn is attached to the missile structure, not shown. Housing 16 is shown in phantom in FIG. 3 to illustrate the manner in which mounting panel 12 is held therewithin by clips 11, and generally comprises a thin wall preferably of plated steel, which wall may be formed by a mandrel or in other conventional manner. Mounting plate 25 is shown in the present embodiment as affixed along the inner portion of the periphery of housing 16 displaced a short distance from and parallel to the longitudinal centerline of the housing. Plate 25 preferably is of the same metal as housing 16 and preferably is affixed thereto by brazing along the edges of the plate.

In FIG. 4, end 20 of housing 16 is shown open and the other end 40 is shown closed by connector adaptor 43. After assembly of the mounting panel and components, both ends of housing 16 preferably are hermetically sealed by brazing hermetic connector adapters thereto. The connector adapter shown, 43, is provided with a collar 44 extending within housing 16. End 20 is recessed at 45 to accommodate its hermetic connector adapter, not shown. The connector adapters preferably are brazed to housing 16 as indicated at 47.

Plate 25 is shown affixed to housing 16 along tapered edge 50 of the flange, in this embodiment the acute angle A between a line perpendicular to the plane of the longitudinal centerline of the housing 16 and the tapered edge 50 being substantially 40°.

To assemble mounting panel 12 in housing 16, a small winch, not shown, may be used by means of which the board may be drawn into the chamber of the housing. Mounting panel 12 will remain as placed within housing 16 due to the friction between clips 11 and the inner surface of the housing, internal vibration damping thereby being obtained between the electronic components and the housing. The toroidal shape of housing 16 and the arcuate shape of its attaching plate 25 operate to decrease the amplitude of housing 16 during vibration. The electronic components mounted on panel 12 thus are protected from vibration and shock primarily through the manner of their being affixed to panel 12 and the manner of assembly and shape of the mounting panel and housing.

The shape of housing 16 and plate 25 may, of course, be changed within the inventive concept in length to such forms as, for example, helical and in cross section with respect to the housing only to oval, triangular, rectangular, etc., to decrease the amplitude of the housing during vibration. Also, clips 11 may be altered in form to cause the natural resonance frequency of mounting panel 12 to differ from that of housing 16 so that very little vibration energy will reach the electronic components mounted on panel 12. Where the weight of the electronics package, including the housing and attaching plate, is an appreciable portion of the weight of the missile, the natural resonance frequency of the package could serve to decrease the amplitude of the missile resonance frequency.

It will be recognized that many modifications and variations of the present invention are possible in the light of the above teachings. It is therefore to be understood that within the scope of the appended claims the invention may be practiced otherwise than as specifically described.

I claim:
1. In a missile structure an electronics package comprising:
   a mounting panel for mounting electronic components;
   said mounting panel including resilient means to space the panel from an enclosure;
   an enclosure for receiving in confining relationship said mounting panel and holding said mounting panel in position;
   said mounting panel being elongate and arcuate in shape and said enclosure being generally circular in cross section and toroidal in shape;
   and securing means for attaching said enclosure to the missile structure;
   the natural resonance frequency of the mounting panel differing appreciably from the natural resonance frequency of the enclosure;
   whereby a substantial portion of the vibration energy in the enclosure is precluded from reaching the electronic components mounted on the mounting panel.
2. In a missile structure an electronics package comprising;
   an elongate curved mounting panel of dielectric material having at least two surfaces for mounting electronic components;
   a plurality of clips secured at intervals along each mounting surface of said mounting panel;
   an enclosure closely configured to the shape of said mounting panel;
   said clips engaging in friction relationship opposite surfaces of said enclosure;
   a plate attached to said enclosure and adapted for mounting in said missile structure; and
   means for hermetically sealing said enclosure;
   whereby the shape of the enclosure and plate operate to decrease the amplitude of vibration of the enclosure in the presence of missile structure vibration.
3. The device as defined in claim 2 wherein said enclosure is toroidal and is closed at either end by connector adapters.
4. The device as defined in claim 2 wherein said clips are resilient and are so constructed as to cause the natural resonance frequency of the mounting panel to differ substantially in amplitude from that of the enclosure whereby a substantial amount of the vibration energy of the missile structure will be precluded from reaching the mounting board.
5. The device as defined in claim 4 wherein said clips are oppositely positioned in pairs on said mounting panel and contact said enclosure only at embossed contact points.

References Cited
UNITED STATES PATENTS

| | | | |
|---|---|---|---|
| 2,976,806 | 3/1961 | Risk et al. | 102—92.5 |
| 3,059,217 | 10/1962 | Boswell | 317—117 X |
| 3,087,095 | 4/1963 | McConkey et al. | 317—99 X |
| 3,188,523 | 6/1965 | Yungkurth | 174—52 X |

ROBERT K. SCHAEFER, *Primary Examiner.*

M. GINSBURG, C. E. WANDS, *Assistant Examiners.*